(12) United States Patent
Tamura et al.

(10) Patent No.: US 11,128,820 B2
(45) Date of Patent: Sep. 21, 2021

(54) RADIATION IMAGING APPARATUS, CONTROL METHOD FOR THE SAME, AND RADIATION IMAGING SYSTEM

(71) Applicant: CANON KABUSHIKI KAISHA, Tokyo (JP)

(72) Inventors: Toshikazu Tamura, Utsunomiya (JP); Tomoyuki Yagi, Chofu (JP); Yuki Iwabuchi, Kawasaki (JP); Yoshiaki Ishii, Kawasaki (JP); Yutaka Ishinari, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/580,049

(22) Filed: Sep. 24, 2019

(65) Prior Publication Data

US 2020/0106970 A1    Apr. 2, 2020

(30) Foreign Application Priority Data

Oct. 1, 2018    (JP) .............................. JP2018-186874

(51) Int. Cl.
*H04N 5/341*    (2011.01)
*G01T 1/17*    (2006.01)
(Continued)

(52) U.S. Cl.
CPC ............... *H04N 5/341* (2013.01); *G01T 1/17* (2013.01); *H04N 5/353* (2013.01); *H04N 5/37457* (2013.01)

(58) Field of Classification Search
CPC .... H04N 5/341; H04N 5/353; H04N 5/37457; H04N 5/378; H04N 1/19; H04N 1/0455;
(Continued)

(56) References Cited

U.S. PATENT DOCUMENTS 6,163,386 A    12/2000  Kobayashi
6,410,900 B1   6/2002   Okamoto
(Continued)

FOREIGN PATENT DOCUMENTS

CN    1764244 A    4/2006
CN    101053249 A   10/2007
(Continued)

OTHER PUBLICATIONS

U.S. Appl. No. 16/598,551, Tomoyuki Yagi, filed Oct. 10, 2019.

*Primary Examiner* — Yogesh K Aggarwal
(74) *Attorney, Agent, or Firm* — Venable LLP

(57) ABSTRACT

A radiation imaging apparatus includes a pixel array including n pixel rows, where n≥3, and a driving circuit configured to scan the pixel array from a first row toward an $n^{th}$ row, counting from one end of the pixel array. In a case where a region of interest is included in a partial region composed of pixel rows from an $i^{th}$ row to a $j^{th}$ row, where $1<i\le j<n$, the driving circuit starts scanning of the pixel array from the first row, and starts scanning of the pixel array from the first row again during scanning of pixel rows from a $(j+1)^{th}$ row to the $n^{th}$ row.

11 Claims, 7 Drawing Sheets

(51) Int. Cl.
*H04N 5/353* (2011.01)
*H04N 5/3745* (2011.01)

(58) Field of Classification Search
CPC .......... H04N 5/3454; H04N 5/32; G01T 1/17;
H01L 27/14609; H01L 27/14658
See application file for complete search history.

(56) References Cited

U.S. PATENT DOCUMENTS

| | | | |
|---|---|---|---|
| 7,342,221 B2 | 3/2008 | Takenaka et al. | |
| 7,343,000 B2 | 3/2008 | Kameshima et al. | |
| 7,381,963 B2 | 6/2008 | Endo et al. | |
| 7,386,089 B2 | 6/2008 | Endo et al. | |
| 7,403,594 B2 | 7/2008 | Endo et al. | |
| 7,442,939 B2 | 10/2008 | Yagi et al. | |
| 7,470,911 B2 | 12/2008 | Yagi et al. | |
| 7,514,663 B2 | 4/2009 | Yagi et al. | |
| 7,532,706 B2 | 5/2009 | Kameshima et al. | |
| 7,541,591 B2 | 6/2009 | Endo et al. | |
| 7,573,038 B2 | 8/2009 | Yokoyama et al. | |
| 7,613,277 B2 | 11/2009 | Takenaka et al. | |
| 7,683,337 B2 | 3/2010 | Takenaka et al. | |
| 7,718,973 B2 | 5/2010 | Endo et al. | |
| 7,724,874 B2 | 5/2010 | Kameshima et al. | |
| 7,732,776 B2 | 6/2010 | Takenaka et al. | |
| 7,750,309 B2 | 7/2010 | Endo et al. | |
| 7,786,448 B2 | 8/2010 | Endo et al. | |
| 7,791,034 B2 | 9/2010 | Kameshima et al. | |
| 7,791,035 B2 | 9/2010 | Yokoyama et al. | |
| 7,839,977 B2 | 11/2010 | Kameshima et al. | |
| 7,847,263 B2 | 12/2010 | Yagi et al. | |
| 7,869,568 B2 | 1/2011 | Yokoyama et al. | |
| 7,872,218 B2 | 1/2011 | Endo et al. | |
| 7,880,145 B2 | 2/2011 | Yagi et al. | |
| 7,994,481 B2 | 8/2011 | Yagi et al. | |
| 8,093,562 B2 | 1/2012 | Yokoyama et al. | |
| 8,107,588 B2 | 1/2012 | Kameshima et al. | |
| 8,167,486 B2 | 5/2012 | Takenaka et al. | |
| 8,222,611 B2 | 7/2012 | Yagi et al. | |
| 8,247,779 B2 | 8/2012 | Kameshima et al. | |
| 8,576,294 B2 | 11/2013 | Kameshima et al. | |
| 8,723,996 B2 | 5/2014 | Yokoyama et al. | |
| 8,792,024 B2 | 7/2014 | Takenaka et al. | |
| 8,809,795 B2 | 8/2014 | Takenaka et al. | |
| 8,829,438 B2 | 9/2014 | Sato et al. | |
| 9,048,154 B2 | 6/2015 | Takenaka et al. | |
| 9,128,196 B2 | 9/2015 | Sato et al. | |
| 9,134,432 B2 | 9/2015 | Iwashita et al. | |
| 9,234,966 B2 | 1/2016 | Sugawara et al. | |
| 9,423,512 B2 | 8/2016 | Sato et al. | |
| 9,445,030 B2 | 9/2016 | Yagi et al. | |
| 9,462,989 B2 | 10/2016 | Takenaka et al. | |
| 9,468,414 B2 | 10/2016 | Ryu et al. | |
| 9,470,800 B2 | 10/2016 | Iwashita et al. | |
| 9,470,802 B2 | 10/2016 | Okada et al. | |
| 9,541,653 B2 | 1/2017 | Iwashita et al. | |
| 9,655,586 B2 | 5/2017 | Yagi et al. | |
| 9,812,474 B2 | 11/2017 | Yagi et al. | |
| 9,971,046 B2 | 5/2018 | Ryu et al. | |
| 9,980,685 B2 | 5/2018 | Iwashita et al. | |
| 9,989,656 B2 | 6/2018 | Sato et al. | |
| 10,009,990 B2 | 6/2018 | Takenaka et al. | |
| 10,197,684 B2 | 2/2019 | Terui et al. | |
| 10,274,612 B2 | 4/2019 | Ishii et al. | |
| 10,349,914 B2 | 7/2019 | Takenaka et al. | |
| 10,416,323 B2 | 9/2019 | Ryu et al. | |
| 10,506,696 B2 | 12/2019 | Tamura et al. | |
| 10,539,684 B2 | 1/2020 | Asai et al. | |
| 10,751,022 B2 | 8/2020 | Ishii | |
| 2002/0190215 A1 | 12/2002 | Tashiro | |
| 2004/0202281 A1 | 10/2004 | Colbeth et al. | |
| 2007/0223887 A1 | 9/2007 | Kanamori | |
| 2009/0109312 A1 | 4/2009 | Noda | |
| 2010/0148080 A1 | 6/2010 | Endo et al. | |
| 2010/0157083 A1 | 6/2010 | Ohya et al. | |
| 2011/0007173 A1 | 1/2011 | Takenaka | |
| 2011/0317054 A1 | 12/2011 | Kameshima et al. | |
| 2013/0193334 A1 | 8/2013 | Dowaki | |
| 2014/0239186 A1 | 8/2014 | Sato et al. | |
| 2014/0361189 A1 | 12/2014 | Kameshima et al. | |
| 2016/0061966 A1 | 3/2016 | Kim | |
| 2016/0116887 A1 | 4/2016 | Isshiki | |
| 2016/0270755 A1 | 9/2016 | Takenaka et al. | |
| 2018/0021004 A1 | 1/2018 | Ishii et al. | |
| 2018/0035060 A1* | 2/2018 | Maruta | H04N 5/3454 |
| 2018/0063933 A1 | 3/2018 | Okada et al. | |
| 2018/0128755 A1 | 5/2018 | Iwashita et al. | |
| 2018/0129120 A1 | 5/2018 | Sato et al. | |
| 2018/0275075 A1 | 9/2018 | Tamura et al. | |
| 2018/0317868 A1 | 11/2018 | Terui et al. | |
| 2018/0328862 A1 | 11/2018 | Sato et al. | |
| 2019/0029618 A1 | 1/2019 | Sato et al. | |
| 2019/0302127 A1 | 10/2019 | Tamura | |

FOREIGN PATENT DOCUMENTS

| | | |
|---|---|---|
| CN | 101243682 A | 8/2008 |
| CN | 101420509 A | 4/2009 |
| CN | 101690158 A | 3/2010 |
| CN | 107645640 A | 1/2018 |
| EP | 0 792 062 | 8/1997 |
| EP | 2 422 513 | 2/2012 |
| JP | H09-321267 A | 12/1997 |
| JP | 2000-316127 A | 11/2000 |
| JP | 3897389 B | 3/2007 |
| JP | 2008-236634 A | 10/2008 |
| JP | 4607099 B | 1/2011 |
| WO | 2004/095064 A | 11/2004 |
| WO | 2010/122894 | 10/2010 |

* cited by examiner

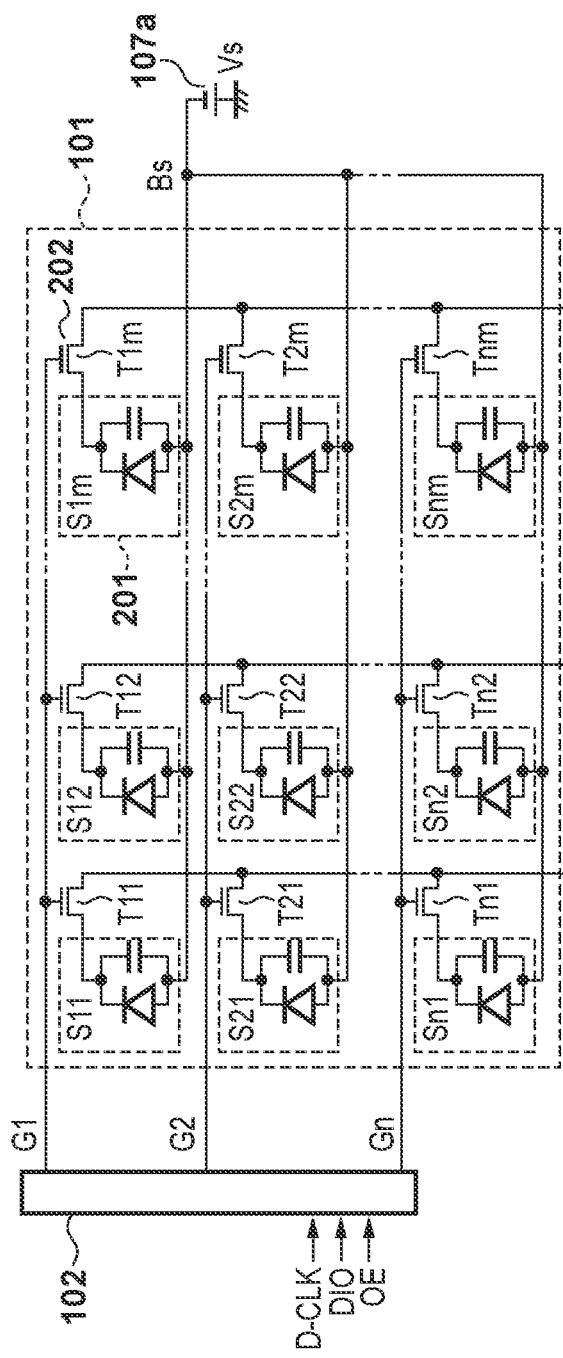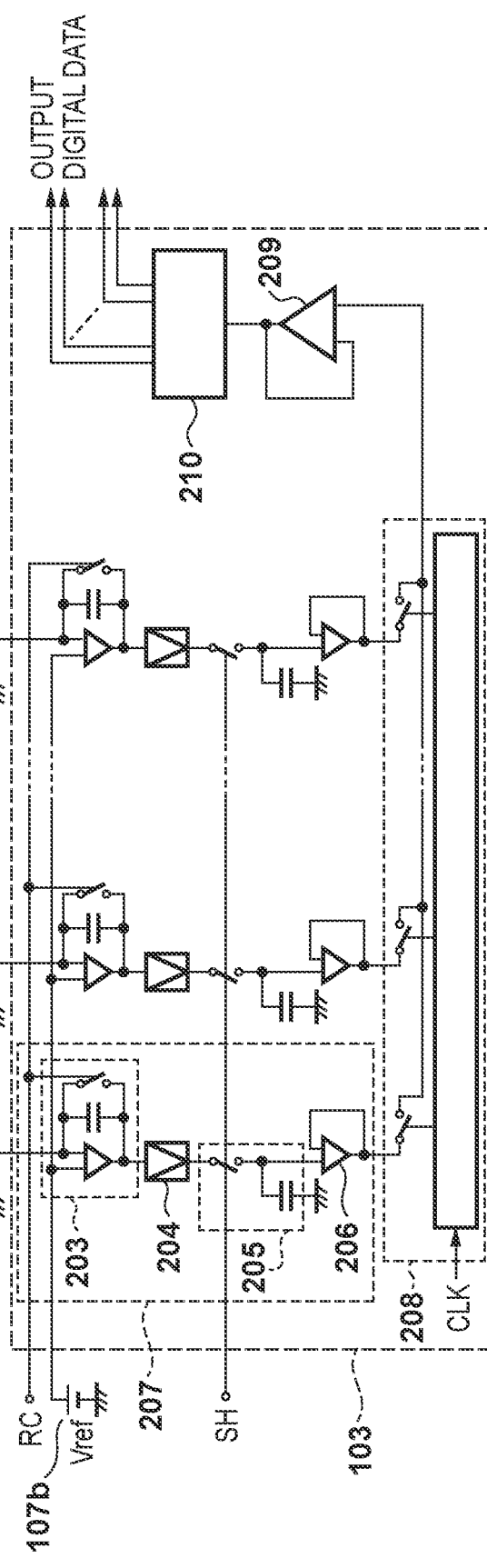
FIG. 2

RADIATION IMAGING APPARATUS, CONTROL METHOD FOR THE SAME, AND RADIATION IMAGING SYSTEM

BACKGROUND OF THE INVENTION

Field of the Invention

The present invention relates to a radiation imaging apparatus, a control method for the same, and a radiation imaging system.

Description of the Related Art

When a radiation imaging apparatus is used in multipurpose angiography or IVR (interventional radiology), there is a case where only a part of a flat panel detector is used as a readout target region (a region of interest) and an image is generated using signals that have been read out from that region. According to Japanese Patent No. 3897389, a frame rate is improved by, after sequentially scanning pixel rows including a readout target region, collectively reading out other pixel rows. According to Japanese Patent No. 4607099, a frame rate is improved by, after sequentially scanning pixel rows including a readout target region, starting irradiation of radiation for the next frame during scanning of another region.

SUMMARY OF THE INVENTION

According to Japanese Patent No. 3897389, the pixel rows including the readout target region are sequentially scanned, whereas other pixel rows are collectively scanned. There is a case where, due to this difference between scanning methods, artifacts occur in an image that is generated immediately after the readout target region has been enlarged. Furthermore, there is a case where a frame rate cannot be sufficiently improved simply by advancing irradiation of radiation as in Japanese Patent No. 4607099. An aspect of the present invention improves a frame rate for a case where a partial region of a detector is used as a readout target while suppressing the occurrence of artifacts.

According to an embodiment, a radiation imaging apparatus, comprising: a pixel array including n pixel rows, where n≥3; and a driving circuit configured to scan the pixel array from a first row toward an $n^{th}$ row, counting from one end of the pixel array, wherein in a case where a region of interest is included in a partial region composed of pixel rows from an $i^{th}$ row to a $j^{th}$ row, where $1<i≤j<n$, the driving circuit starts scanning of the pixel array from the first row, and starts scanning of the pixel array from the first row again during scanning of pixel rows from a $(j+1)^{th}$ row to the $n^{th}$ row is provided.

Further features of the present invention will become apparent from the following description of exemplary embodiments (with reference to the attached drawings).

BRIEF DESCRIPTION OF THE DRAWINGS

FIG. 2 is a block diagram illustrating a configuration of a radiation imaging apparatus according to an embodiment of the present invention.

DESCRIPTION OF THE EMBODIMENTS

Figure 1:
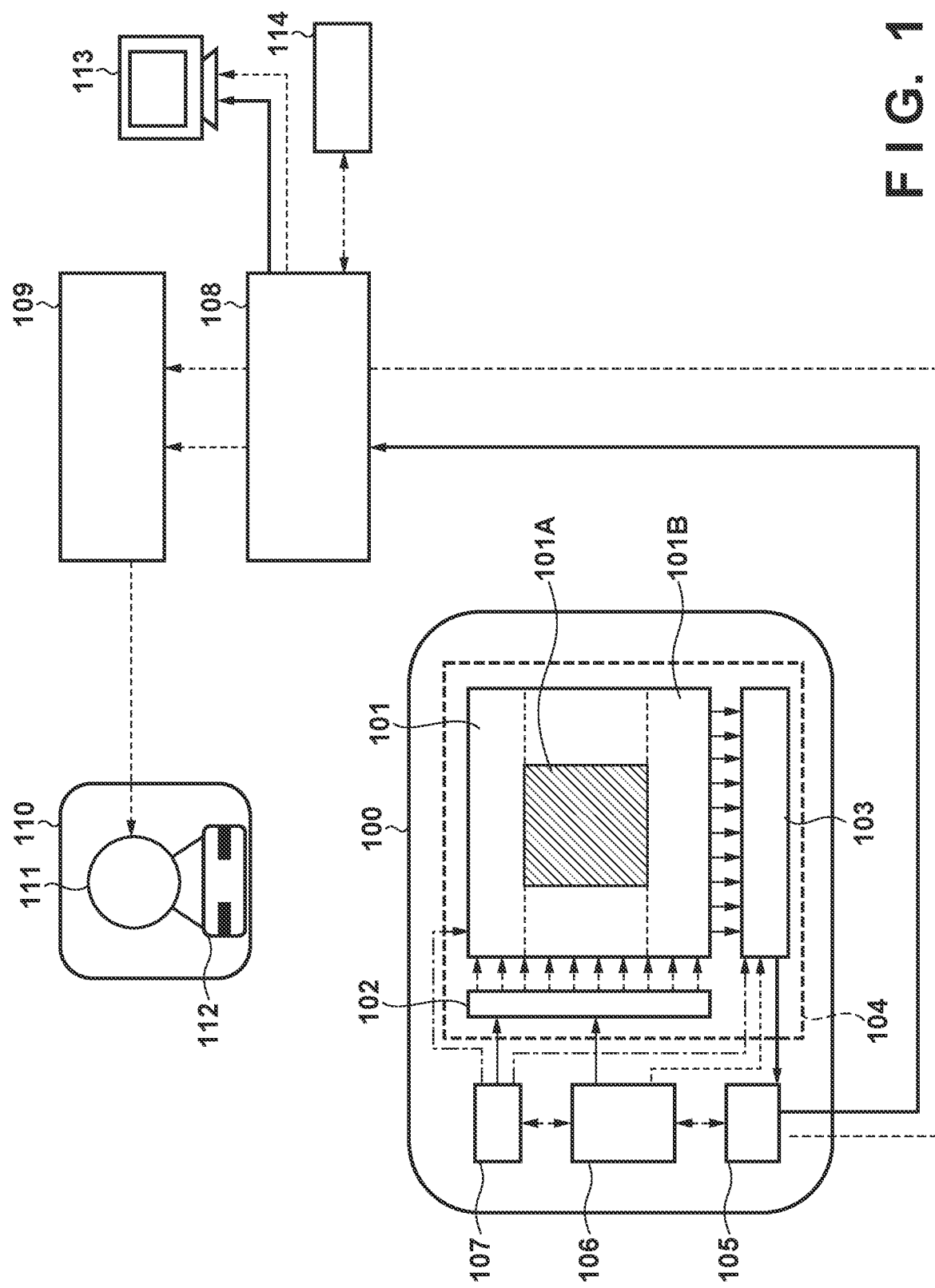
FIG. 1 is a block diagram illustrating a configuration of a radiation imaging system according to an embodiment of the present invention.

Embodiments of the present invention will be described below with reference to the attached drawings. The same reference numerals denote like elements throughout various embodiments, and duplicate explanations are omitted. Furthermore, each embodiment can be changed and combined as appropriate. In the following embodiments, radiation may include X-rays, alpha rays, beta rays, gamma rays, and so forth.

A radiation imaging system shown in FIG. 1 includes a radiation imaging apparatus 100, a control computer 108, a radiation control apparatus 109, a radiation generation apparatus 110, a display apparatus 113, and a control console 114. The radiation imaging apparatus 100 includes an FPD (flat panel detector) 104, a signal processing unit 105, a control unit 106, and a power source unit 107. The FPD 104 includes a detection unit 101, a driving circuit 102, and a readout circuit 103. The detection unit 101 includes a plurality of pixels that convert radiation or light into electrical signals. These plurality of pixels are arranged in a matrix, and constitute a pixel array. The driving circuit 102 drives the detection unit 101. The readout circuit 103 reads out electrical signals from the driven detection unit 101 as image data. The signal processing unit 105 processes image data from the FPD 104, and outputs the resultant image data to the control computer 108. The control unit 106 controls the operations of the FPD 104 by supplying a control signal to each constituent element. The power source unit 107 supplies a bias voltage to each constituent element.

The signal processing unit 105 receives a control signal from the control computer 108, which will be described later, and supplies the same to the control unit 106. The control unit 106 receives the control signal from the control computer 108, which will be described later, and controls the driving circuit 102. The power source unit 107 includes a power source circuit, such as a regulator, that receives voltages from an external power source or an internal battery, which is not illustrated, and supplies voltages necessary for the detection unit 101, the driving circuit 102, and the readout circuit 103.

The control computer 108 brings the radiation generation apparatus 110 and the radiation imaging apparatus 100 into synchronization with each other, transmits a control signal that determines a state of the radiation imaging apparatus 100, and performs image processing for correction, storage, and display with respect to image data from the radiation imaging apparatus 100. The control computer 108 also transmits, to the radiation control apparatus 109, a control signal that determines irradiation conditions of radiation based on information from the control console 114.

The radiation control apparatus 109 receives a control signal from the control computer 108, and controls an operation of irradiation of radiation from a radiation source 111, which is included in the radiation generation apparatus 110, and the operations of an irradiation field diaphragm mechanism 112. The irradiation field diaphragm mechanism 112 has a function that can change a predetermined irradiation field, which is a region in which the detection unit 101 of the FPD 104 is irradiated with radiation or light corresponding to radiation. The control console 114 inputs information of an examinee and shooting conditions as parameters for various types of control by the control computer 108, and transmits them to the control computer 108. The display apparatus 113 displays image data that has undergone image processing in the control computer 108.

The radiation imaging apparatus 100 can generate image data using a part or all of the pixels in the pixel array as a readout target region. For example, the radiation imaging apparatus 100 may use a partial region 101A of the pixel array as the readout target region (a region of interest), or may use an entire region 101B of the pixel array as the readout target region. The radiation imaging apparatus 100 is capable of switching between the readout target regions (regions of interest). Furthermore, the radiation imaging apparatus 100 may be capable of changing the size of the readout target region.

In the present embodiment, it is assumed that the total number of pixels in the FPD 104 is approximately 2800 rows×approximately 2800 columns. The region 101A is a region composed of partial pixels, such as pixels corresponding to approximately 1000 rows×approximately 1000 columns, that are included in the plurality of pixels. The readout circuit 103 outputs an image corresponding only to the region 101A to the control computer 108 by discarding, from among signals of respective rows that have been read out from a partial region composed of a plurality of pixel rows including the region 101A, a portion corresponding to 900 columns on each side.

Next, a detailed configuration of the radiation imaging apparatus 100 will be described with reference to FIG. 2. The detection unit 101 has a plurality of pixels that are arranged in a matrix of n rows×m columns (where n≥3, m≥1). For example, in a case where the radiation imaging apparatus 100 is 17 inches in size, the detection unit 101 has pixels of approximately 2800 rows×approximately 2800 columns.

The pixels have a conversion element 201 that converts radiation or light into electric charges, and a switch element 202 that outputs an electrical signal corresponding to the electric charges. The conversion element 201 and the switch element 202 that are located on row x and column y (1≤x≤n, 1≤y≤n) are expressed as Sxy and Txy, respectively. An indirect-type conversion element that has, on the side on which radiation is incident, a wavelength conversion member (e.g., a scintillator) for converting radiation into light of a wavelength band that can be detected by a photoelectric converter, or a direct-type conversion element that converts radiation directly into electric charges, is used as the conversion element 201. The photoelectric converter is, for example, a PIN photodiode which is arranged on an insulation substrate, such as a glass substrate, and which is mainly made of amorphous silicon.

A transistor having a control terminal and two main terminals is used as the switch element 202. One example of such a transistor is a thin-film transistor (TFT). One electrode of the conversion element 201 is electrically connected to one of the two main terminals of the switch element 202, and the other electrode of the conversion element 201 is electrically connected to a bias power source 107a via a shared bias line Bs. Control terminals of the plurality of switch elements 202 located on the $x^{th}$ row (Tx1 to Txm) are mutually electrically connected to a driving line Gx of the $x^{th}$ row. Driving lines G1 to Gn are collectively referred to as driving lines G. A driving signal that controls the conductive state of the switch elements 202 is provided to these control terminals from the driving circuit 102 via the driving line Gx on a row-by-row basis. The driving circuit 102 switches between the conductive state and the non-conductive state of the switch elements 202 on a row-by-row basis; in this way, the driving circuit 102 scans the pixels on a row-by-row basis.

The other main terminals (the main terminals that are not connected to the conversion elements 201) of the switch elements 202 that are located on the $y^{th}$ column (T1y to Tny) are electrically connected to a signal line Sigy of the $y^{th}$ column. Signal lines Sig1 to Sigm are collectively referred to as signal lines Sig. While the switch element 202 (T1y to Tny) is in the conductive state, an electrical signal corresponding to electric charges of the conversion element 201 is read out by the readout circuit 103 via the signal line Sigy. The plurality of signal lines Sig1 to Sigm that are arranged in a column direction transmit, in parallel, electrical signals output from a plurality of pixels to the readout circuit 103.

The readout circuit 103 includes amplification circuits 207 that, for respective signal lines Sig, amplify electrical signals output from the detection unit 101. Each amplification circuit 207 includes an integral amplifier 203, a variable amplifier 204, a sample and hold circuit 205, and a buffer amplifier 206. The integral amplifier 203 amplifies an electrical signal output from the detection unit 101. The variable amplifier 204 amplifies the electrical signal from the integral amplifier 203. The sample and hold circuit 205 samples and holds the electrical signal amplified by the variable amplifier 204. The buffer amplifier 206 applies impedance conversion to the held signal and outputs the resultant signal.

The integral amplifier 203 has an operational amplifier that amplifies and outputs an electrical signal that have been read out, an integral capacitor, and a reset switch. The integral amplifier 203 can change an amplification factor by changing a value of the integral capacitor. An electrical signal output from the detection unit 101 is input to an inverting input terminal of the operational amplifier. A reference voltage Vref is input to a non-inverting input terminal of the operational amplifier from a reference power source 107b. The amplified electrical signal is output from an output terminal of the operational amplifier. The integral capacitor is arranged between the inverting input terminal and the output terminal of the operational amplifier. The sample and hold circuit 205 is composed of a sampling switch and a sampling capacitor.

The readout circuit 103 further includes a multiplexer 208, a buffer amplifier 209, and an A/D converter 210. The multiplexer 208 sequentially outputs the electrical signals that have been read out in parallel from the respective amplification circuits 207; these electrical signals are output as an image signal in the form of a serial signal. The A/D converter 210 converts an analog electrical signal output from the buffer amplifier 209 into digital data, and outputs the digital data. This output digital data is processed by the signal processing unit 105 and output to the control computer 108.

In accordance with a control signal D-CLK, a control signal OE, and a control signal DIO that have been input from the control unit 106, the driving circuit 102 outputs, to each driving line G, a driving signal having a conductive voltage Vcom that places the switch elements 202 into the conductive state and a non-conductive voltage Vss that places them into the non-conductive state. The driving circuit 102 drives the detection unit 101 by controlling the conductive state and the non-conductive state of the switch elements 202.

The bias power source 107a and the reference power source 107b are included in the power source unit 107. The bias power source 107a supplies a bias voltage Vs mutually to the electrodes of the respective conversion elements 201 via the bias line Bs. The reference power source 107b supplies the reference voltage Vref to the positive input terminals of the operational amplifiers within the respective integral amplifiers 203.

The control unit 106 receives a control signal from, for example, the control computer 108 located outside the radiation imaging apparatus 100 via the signal processing unit 105, and controls the operations of the FPD 104 by providing various types of control signals to the driving circuit 102, the power source unit 107, and the readout circuit 103 in accordance with the received control signal. The control unit 106 controls the operations of the driving circuit 102 by providing the control signal D-CLK, the control signal OE, and the control signal DIO to the driving circuit 102. The control signal D-CLK is a shift clock for a shift register included in the driving circuit. The control signal DIO is a pulse signal that is transferred by the shift register. The control signal OE is a signal that controls an output end of the shift register. The shift register is composed of series-connected flip-flop circuits of multiple stages. When the control signal D-CLK is placed into the H level, each flip-flop circuit within the shift register replaces a signal that is held by itself with the input from a flip-flop circuit of a preceding stage. When the control signal OE is placed into the H level, each flip-flop circuit supplies, to a driving signal G, a voltage corresponding to the level of a signal that is held by itself. The flip-flop circuits apply the Vcom voltage to the driving line G when holding a signal of the H level, and apply the Vss voltage to the driving line G when applying a signal of the L level. The switch elements 202 of the pixels that are connected to the driving line G to which the Vcom voltage has been applied are placed into the conductive state, and signal charges are transferred from the conversion elements 201 of the corresponding row to the signal lines Sig. When the control signal OE is at the L level, each flip-flop circuit applies the Vss voltage to the driving line G irrespective of the level of a signal that is held by itself.

The control unit 106 controls the operations of each constituent element of the readout circuit 103 by providing a control signal RC, a control signal SH, and a control signal CLK to the readout circuit 103. The control signal RC controls the operations of the reset switches of the integral amplifiers. The control signal SH controls the operations of the sample and hold circuits 205. The control signal CLK controls the operations of the multiplexer 208.

Figure 3:
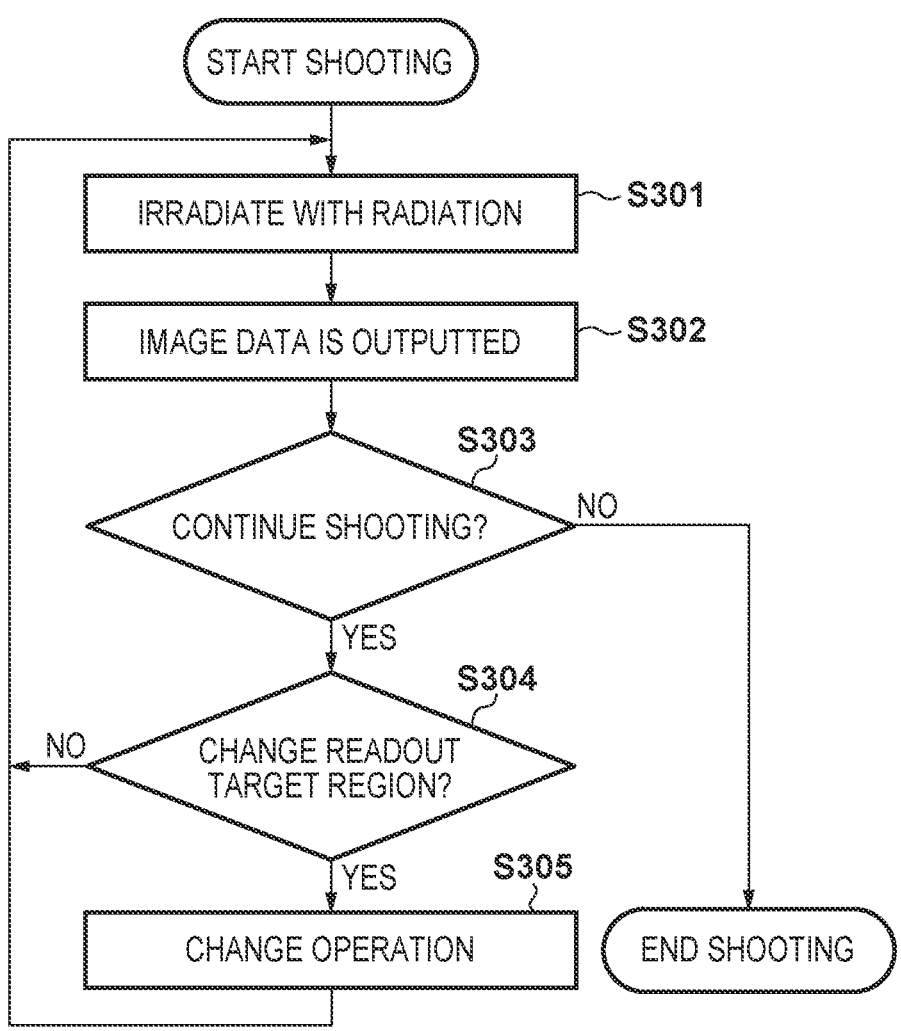
FIG. 3 is a flow diagram illustrating the operations of the radiation imaging system according to an embodiment of the present invention.

Next, the operations of the radiation imaging system of FIG. 1 will be described with reference to FIG. 3. These operations are started by an operator giving an instruction for starting the shooting after irradiation conditions are determined by the operator operating the control console 114.

In step S301, the radiation control apparatus 109 irradiates an object with radiation under the set irradiation conditions by controlling the radiation generation apparatus 110. In step S302, the radiation imaging apparatus 100 outputs image data corresponding to radiation that has passed through the object. The output image data undergoes image processing in the control computer 108, and is displayed on the display apparatus 113.

In step S303, the control computer 108 confirms with the operator whether the shooting needs to be continued. If an instruction indicating that the shooting need not be continued is received from the operator (NO of step S303), the control computer 108 ends the shooting. If an instruction indicating that the shooting needs to be continued is received from the operator (YES of step S303), the control computer 108 advances the processing to step S304.

In step S304, the control computer 108 confirms with the operator whether the readout target region needs to be changed. If an instruction indicating that the readout target region need not be changed is received from the operator (NO of step S304), the control computer 108 controls the radiation control apparatus 109 and the radiation generation apparatus 110 under the shooting conditions that were determined ahead of time. If an instruction indicating that the readout target region needs to be changed is received from the operator (YES of step S304), the control computer 108 determines the changed readout target region. Thereafter, the control computer 108 provides the radiation imaging apparatus 100 with a control signal that causes an operation of changing the readout target region to be performed. The radiation imaging apparatus 100 performs the changing operation in accordance with this control signal. After completion of the changing operation, the control computer 108 provides the radiation imaging apparatus 100 with a control signal based on the determined readout target region, and the next shooting is performed with respect to the determined readout target region.

Figure 4:
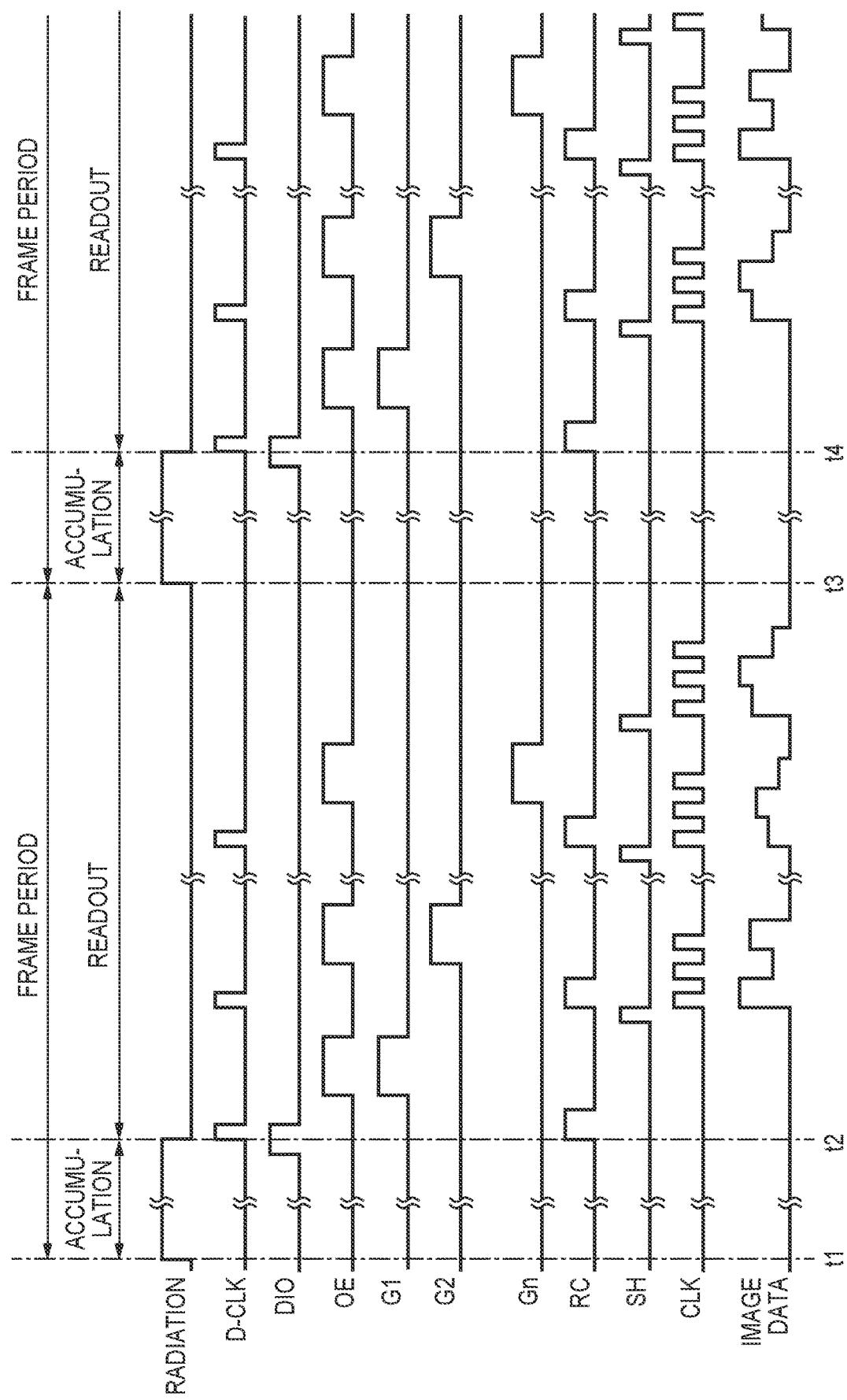
FIG. 4 is a timing diagram illustrating an operation of scanning an entirety of a pixel array according to an embodiment of the present invention.

Next, with reference to FIG. 4, a description will be given of the operations of the radiation imaging apparatus 100 for a case where the readout target region of the driving circuit 102 is the region 101B (that is to say, the entire pixel array). After the detection unit 101 has entered a state where it can perform shooting, the radiation imaging apparatus 100 carries out a shooting operation of performing readout from the FPD 104 upon receiving a control signal from the control computer 108. The radiation imaging apparatus 100 repeats an accumulation operation in which the conversion elements 201 generate and accumulate electric charges in accordance with irradiation of radiation ("accumulation" in the figure), and a readout operation in which image data is output based on the electric charges generated through the accumulation operation ("readout" in the figure).

At time t1, the radiation imaging apparatus 100 starts the accumulation operation for generating the first frame. From time t1 to time t2, the radiation generation apparatus 110 irradiates the radiation imaging apparatus 100 with radiation. Across time t2, the control unit 106 temporarily places the control signal DIO into the H level. As a result, a signal of the H level is supplied to the shift register in the driving circuit 102. At time t2, the control unit 106 temporarily switches the control signal D-CLK to the H level. As a result, the content held by each flip-flop circuit of the shift register in the driving circuit 102 is shifted. Also, the content held by the flip-flop circuit of the first stage in the shift register is placed into the H level.

Subsequently, the control unit 106 temporarily places the control signal OE into the H level. As a result, the driving signal of the H level (Vcom) is supplied to the driving line G1 of the first row, and the driving signal of the L level (Vss) is supplied to the driving lines G2 to Gn of other rows. This places the switch elements 202 included in the first pixel row (T11 to Tim) into the conductive state, thereby outputting, to the respective signal lines Sig, electrical signals based on the electric charges generated in the conversion elements 201 included in the first pixel row (S11 to S1$m$). The electrical signals that have been output in parallel via the respective signal lines Sig are amplified by the integral amplifiers 203 and the variable amplifiers 204 in the respective amplification circuits 207. The sample and hold circuits are actuated by the control signal SH, and the amplified electrical signals are held in parallel by the sample and hold circuits 205 within the respective amplification circuits.

After the electrical signals are held by the sample and hold circuits 205, the control unit 106 temporarily switches the control signal D-CLK to the H level. As a result, the content held by each flip-flop circuit of the shift register in the driving circuit 102 is shifted. This places the content held by the flip-flop circuit of the second stage in the shift register into the H level. Furthermore, as the control signal DIO is at the L level, the content held by the flip-flop circuit of the first stage in the shift register is placed into the L level. Subsequently, the control unit 106 temporarily places the control signal OE into the H level. As a result, the signal of the H level (Vcom) is supplied to the driving line G2 of the second row, and the signal of the L level (Vss) is supplied to the driving lines G1 and G3 to Gn of other rows. This places the switch elements 202 included in the second pixel row (T21 to T2$m$) into the conductive state. During a period in which the switch elements 202 of the second row (T21 to T2$m$) are in the conductive state, the multiplexer 208 sequentially outputs the electrical signals held by the sample and hold circuits 205. In this way, the electrical signals from the pixels of the first row, which have been read out in parallel, are converted into serial image signals and output, and the A/D converter 210 converts them into image data corresponding to m columns and outputs the image data. The control unit 106 repeats the foregoing operations until the signal of the H level (Vcom) is supplied to the driving line Gn of the $n^{th}$ row. In this way, image data corresponding to one frame is output from the radiation imaging apparatus 100.

After the signal of the H level (Vcom) has been supplied to the driving line Gn of the $n^{th}$ row, the radiation imaging apparatus 100 starts the accumulation operation for generating the second frame at time t3, and starts the readout operation for generating the second frame at time t4. As these operations are similar to those for the first frame, a description thereof is omitted. A period from the start of the accumulation operation for a certain frame until the start of the accumulation operation for the next frame, like a period from time t1 to time t3, is referred to as a frame period. A reciprocal for the frame period is referred to as a frame rate.

Next, with reference to FIG. 5, a description will be given of an overview of the operations of the radiation imaging apparatus 100 for a case where the readout target region is the region of interest represented by the readout region 101A (that is to say, a part of the pixel array). For the sake of explanation, it is assumed that the entire pixel array includes pixels of 2800 rows×2800 columns, and the region 101A is composed of pixels from the 901$^{st}$ row to the 1900$^{th}$ row, and from the 901$^{st}$ column to the 1900$^{th}$ column. In this case, the region 101A is included in a partial region composed of pixel rows from the 901$^{st}$ row to the 1900$^{th}$ row. The size of the region 101A is, for example, 15 cm×15 cm.

Figure 5:
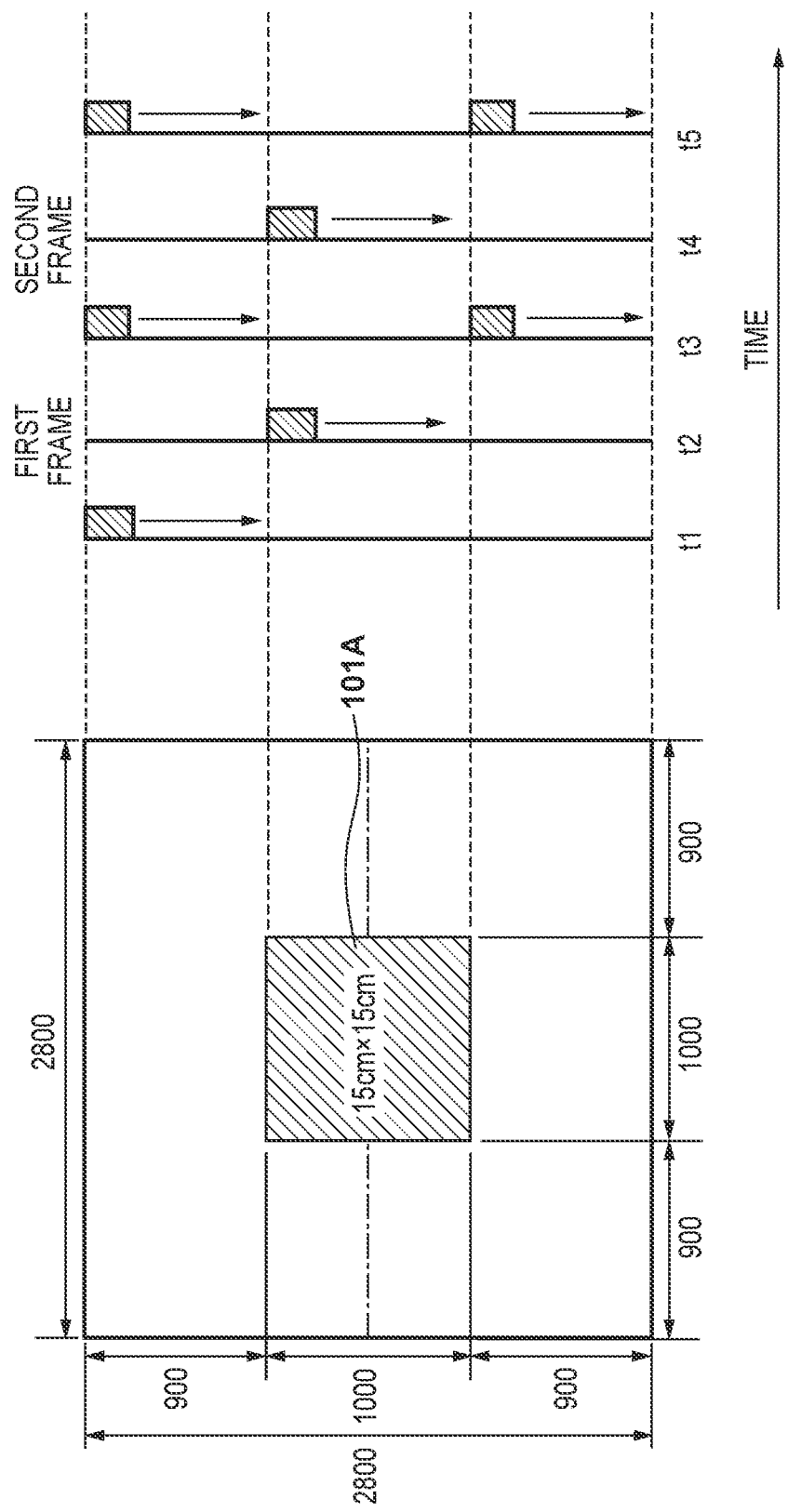
FIG. 5 is a schematic diagram illustrating an operation of scanning a part of the pixel array according to an embodiment of the present invention.

On the right side of FIG. 5, scanned pixel rows are shown using pulses. Scanned pixel rows denote pixel rows to which the driving signal of the H level (Vcom) that is intended to place the switch elements 202 into the conductive state is supplied. First, in order to generate the first frame, the driving circuit 102 starts to supply the driving signal of the H level from the first pixel row. At time t2, the supply of the driving signal of the H level reaches the 901$^{st}$ pixel row (that is to say, the first row of the region 101A).

At time t3, the driving circuit 102 supplies the driving signal of the H level to the 1901$^{st}$ pixel row (that is to say, the row next to the region 101A), and also supplies the driving signal of the H level to the first pixel row in order to generate the second frame. From time t3 to time t4, the driving signal of the H level is supplied to two rows simultaneously.

At time t4, the supply of the driving signal of the H level for generating the second frame reaches the 901$^{st}$ pixel row (that is to say, the first row of the region 101A). At this point, the supply of the driving signal of the H level for the first frame has been completed. Therefore, from time t4 to time t5, the driving signal of the H level is supplied only to one row at any time.

Figure 6:
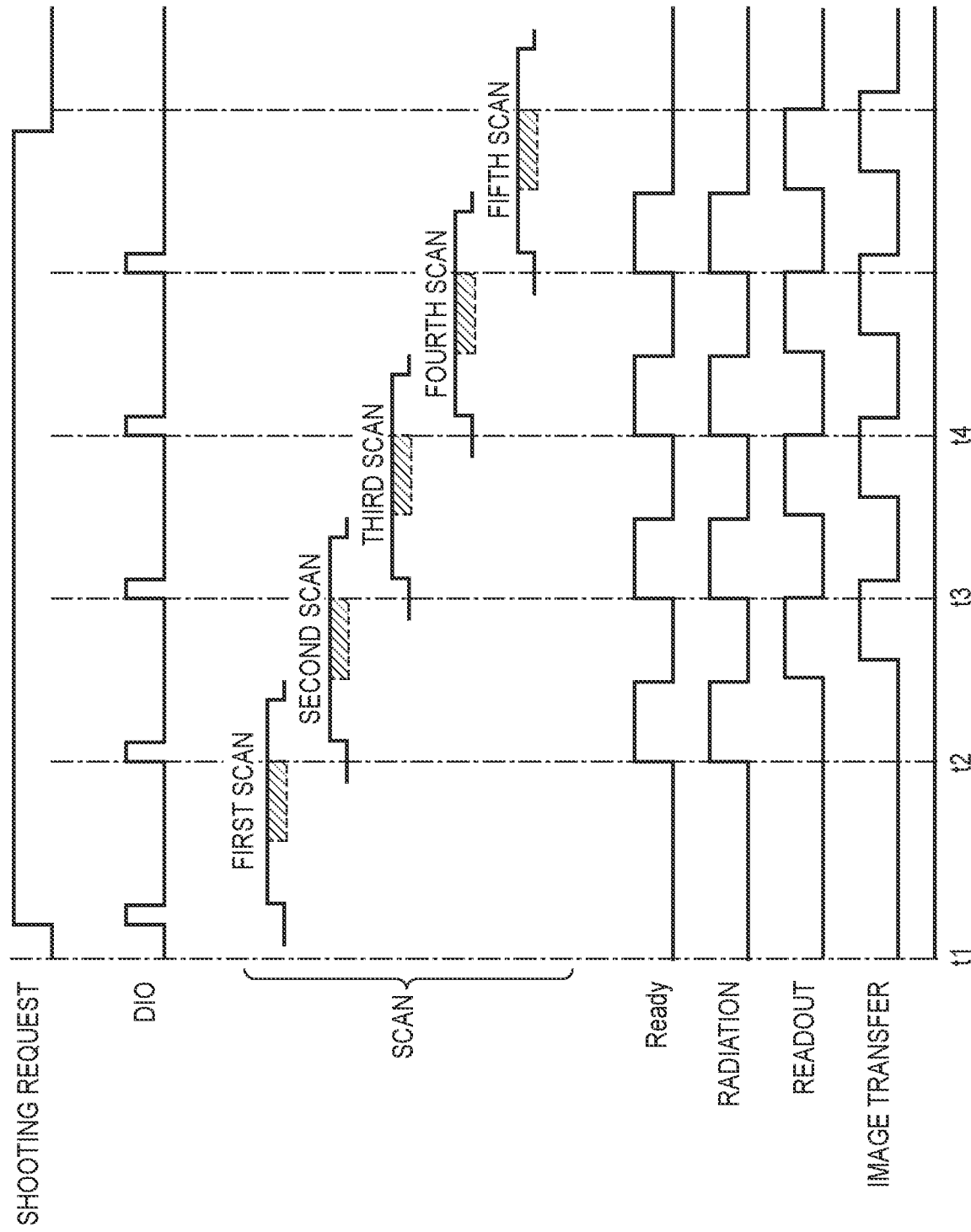
FIG. 6 is a timing diagram illustrating an operation of scanning a part of the pixel array according to an embodiment of the present invention.

Next, with reference to FIG. 6, a description will be given of the details of the operations of the radiation imaging apparatus 100 for the case where the readout target region is the region 101A. In FIG. 6, "scan" denotes a period from the start of scanning of the first pixel row to the completion of scanning of the $n^{th}$ pixel row for generating each frame. In each period, a portion with hatching represents scanning of pixel rows that compose the region 101A.

After time t1, when a shooting request signal ("shooting request" in the figure) is enabled (H level), the control unit 106 temporarily switches the control signal DIO to the H level. Thereafter, the driving circuit 102 scans the pixel array for the first time. This scanning is scanning for resetting the detection unit 101, and image data need not be generated from signals output from the detection unit 101. Scanning of the pixel array is similar to scanning that has been described using FIG. 4.

Upon completion of scanning of the region 101A through the first-time scanning of the pixel array, the control unit 106 temporarily switches a ready signal ("Ready" in the figure) to be transmitted to the radiation control apparatus 109 to the H level at time t2. Consequently, the radiation control apparatus 109 determines that irradiation of radiation can be started, and causes the radiation generation apparatus 110 to start irradiation of radiation. In parallel with this, the control unit 106 temporarily switches the control signal DIO to the H level. As a result, scanning of the pixel array is started for the second time.

At time t2, the second-time scanning of the pixel array reaches the region 101A. At this point, the first-time scanning of the pixel array and irradiation of radiation have been completed. From time t2 to time t3, the driving circuit 102 scans the region 101A, and the readout circuit 103 reads out signals from the detection unit 101 and outputs image data. The image data output from the readout circuit 103 is transferred to the control computer 108 at a timing of image transfer (during a period in which "image transfer" in the figure is at the H level), and is displayed on the display apparatus 113 as one frame. Subsequently, succeeding frames are processed in a similar manner. Thereafter, when the shooting request signal is disabled (L level), the driving circuit 102 does not newly start scanning of the pixel array.

Below is a generalized description of the above-described operations for the case where the readout target region is the readout region 101A. The pixel array of the detection unit 101 includes n pixel rows (where n≥3). In the above-described example, n=2800. The driving circuit 102 scans the pixel array from the first row toward the $n^{th}$ row, counting from one end (the top end in FIG. 5) of the pixel array. The region 101A, which is the readout target region, is included in a partial region composed of pixel rows from the $i^{th}$ row to the $j^{th}$ row (where $1<i≤j<n$). In the above-described example, $i=901$, and $j=1900$. In this case, the driving circuit 102 starts scanning of the pixel array from the first row. Thereafter, during scanning of pixel rows from the $(j+1)^{th}$ row to the $n^{th}$ row, scanning of the pixel array is started from the first row again.

The driving circuit 102 may include a shift register of n stages that correspond to the n pixel rows. The shift register of n stages transfers, from the first stage toward the $n^{th}$ stage, a driving signal that gives an instruction for driving a corresponding row. When the readout target region is the region 101A, the shift register of n stages starts transferring the driving signal of the H level from the first stage. During transfer of the driving signal from the $(j+1)^{th}$ stage to the $n^{th}$ stage, transfer of the driving signal of the H level is started from the first stage again.

In the above-described operations, a part of scanning of the pixel array for generating a certain frame overlaps with a part of scanning of the pixel array for generating the next frame. Therefore, the frame rate is improved when the readout target region is the region 101A. Furthermore, as a scanning method for a region other than the region 101A is the same as the above-described scanning method for the region 101B, the occurrence of artifacts immediately after the enlargement of the readout target region from the region 101A to the region 101B is suppressed. As a result, it is possible to make a quick transition to shooting after the enlargement of the readout target region.

When the readout target region is the region 101A, the driving circuit 102 may start scanning of the pixel array from the first row again during scanning of pixel rows from the $(n-i+1)^{th}$ row to the $n^{th}$ row. The number of pixel rows from the $(n-i+1)^{th}$ row to the $n^{th}$ row is i. Therefore, when this condition is satisfied, scanning of the region 101A does not overlap with scanning of another row.

The relationship $i=n-j+1$ may be satisfied. This condition means that the number (i) of pixel rows preceding the region 101A matches the number $(n-j+1)$ of pixel rows succeeding the region 101A. In this case, scanning of the pixel array for generation of the next frame can be started at the time of completion of scanning of the region 101A, thereby further improving the frame rate.

When the readout target region is the region 101A, the driving circuit 102 may start scanning of the pixel array from the first row again at the time of completion of scanning of the $(n-i+1)^{th}$ pixel row. By restarting scanning of the pixel array at this point, scanning of the region 101A for the next frame can be started immediately after completion of scanning of the pixel array for a certain frame.

Alternatively, when the readout target region is the region 101A, the driving circuit 102 may start scanning of the pixel array from the first row again at the time of completion of scanning of the $(n-i+\alpha)^{th}$ pixel row (where $\alpha≥2$). By restarting scanning of the pixel array at this point, scanning of the region 101A for the next frame can be started after scanning of $(\alpha-1)$ pixel rows following the completion of scanning of the pixel array for a certain frame. This can reduce artifacts in a boundary portion between an area in which two rows of the pixel array are scanned simultaneously and an area in which only one row of the pixel array is scanned.

In the above-described example, the driving circuit 102 scans the pixel array on a row-by-row basis from the first row toward the $n^{th}$ row. Alternatively, the driving circuit 102 may perform pixel binning by scanning the pixel array from the first row toward the $n^{th}$ row by multiple rows (e.g., two rows or three rows) at a time. Even when pixel binning is performed, the frame rate can be improved through the operations similar to the above-described operations.

Figure 7A:
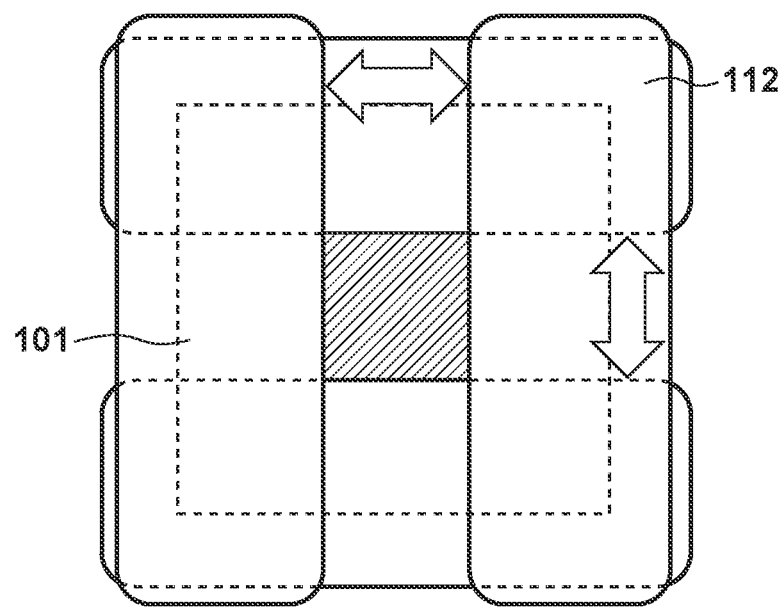
FIGS. 7A and 7B are block diagrams illustrating a configuration of a radiation generation apparatus according to an embodiment of the present invention.
Figure 7B:
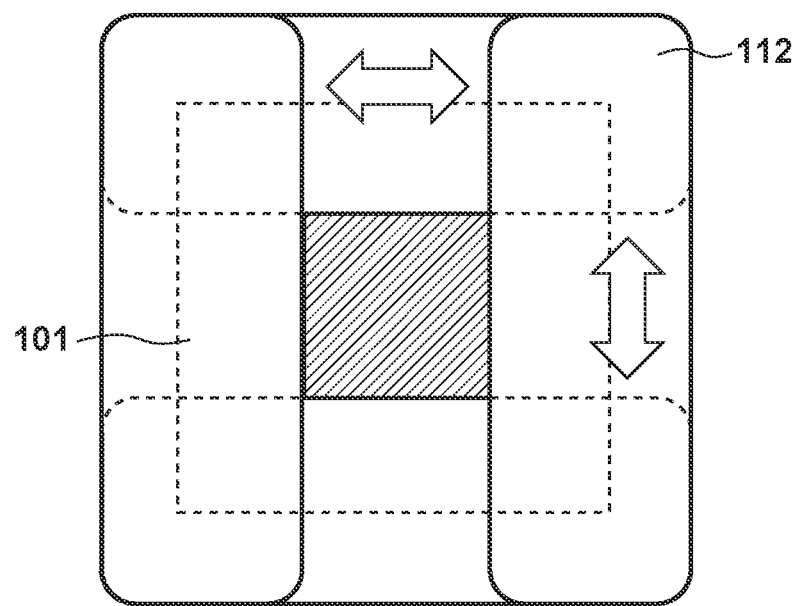

Next, cooperation between the radiation imaging apparatus 100 and the radiation generation apparatus 110 will be described with reference to FIGS. 7A and 7B. As shown in FIGS. 7A and 7B, the radiation generation apparatus 110 can set an irradiation region for radiation using the irradiation field diaphragm mechanism 112. For example, the radiation generation apparatus 110 sets the irradiation region by moving the irradiation field diaphragm mechanism 112 upward, downward, leftward, and rightward as indicated by arrows.

The radiation imaging apparatus 100 sets the readout target region in accordance with the irradiation region of the radiation generation apparatus 110. For example, assume a case where the irradiation region of the radiation generation apparatus 110 has been enlarged from the state of FIG. 7A to the state of FIG. 7B. In this case, as the top row number of the readout target region becomes small (the above-described i becomes small), the radiation imaging apparatus 100 delays the start of scanning of the pixel array for the next frame. On the other hand, assume a case where the irradiation region of the radiation generation apparatus 110 has been reduced from the state of FIG. 7B to the state of FIG. 7A. As the top row number of the readout target region becomes large (the above-described i becomes large), the radiation imaging apparatus 100 advances the start of scanning of the pixel array for the next frame. In this way, the frame rate is further improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-186874, filed on Oct. 1, 2018, which is hereby incorporated by reference herein in its entirety.

What is claimed is:

1. A radiation imaging apparatus, comprising:
   a pixel array including n pixel rows, where $n≥3$; and
   a driving circuit configured to scan the pixel array from a first row toward an $n^{th}$ row, count from one end of the pixel array, wherein
   when a region of interest is included in a partial region of pixel rows from row i to row j, where $1<i≤j<n$, the driving circuit starts scanning the pixel array from the first row, and again starts scanning the pixel array from the first row during scanning of pixel rows from row $(j+1)$ to row n.

2. The radiation imaging apparatus according to claim 1, wherein the driving circuit includes a shift register of n stages that correspond to the n pixel rows,
   the shift register of n stages transfers, from a first stage to the $n^{th}$ stage, a driving signal that instructs to scan a corresponding row, and
   when the region of interest is included in the partial region, the shift register starts transferring the driving signal from the first stage, and again starts transferring the driving signal from the first stage during transfer of the driving signal from stage $(j+1)$ to stage n.

3. The radiation imaging apparatus according to claim 2, wherein the pixels have a conversion element configured to convert radiation or light into electric charges, and a switch element configured to output an electrical signal corresponding to the electric charges, and the driving circuit starts the scanning by supplying the driving signal of a level that places the switch element intra a conductive state.

4. The radiation imaging apparatus according to claim 1, wherein when the region of interest is included in the partial region, the driving circuit again starts scanning the pixel array from the first row during scanning of pixel rows from row (n−i+1) to row n.

5. The radiation imaging apparatus according to claim 4, wherein the region of interest is included in the partial region, the driving circuit again starts scanning the pixel array from the first row at the time scanning pixel row (n−i+1) is completed.

6. The radiation imaging apparatus according to claim 4, wherein when the region of interest is included in the partial region, the driving circuit again starts scanning the pixel array from the first row again at the time scanning pixel row (n−i+α) is completed, where α≥2.

7. The radiation imaging apparatus according to claim 1, wherein i=n−j+1.

8. The radiation imaging apparatus according to claim 1, wherein the driving circuit scans the pixel array from the first row toward row n by multiple rows at a time.

9. A radiation imaging system, comprising:
the radiation imaging apparatus according to claim 1; and
a radiation generation apparatus configured to irradiate the radiation imaging apparatus with radiation.

10. The radiation imaging system according to claim 9, wherein the radiation generation apparatus is configured to set an irradiation region, and
the radiation imaging apparatus is configured to set the partial region in accordance with the irradiation region.

11. A method of controlling a radiation imaging apparatus that includes a pixel array including n pixel rows, where n≥3, and a driving circuit configured to scan the pixel array, the method comprising:
scanning the pixel array from a first row toward row n, counting from one end of the pixel array, wherein
when a region of interest is included in a partial region composed of pixel rows from row i to row j, where 1<i≤j<n, scanning the pixel array starts from the first row and again starts from the first row during scanning of pixel rows from row (j+1) to row n.

* * * * *